Nov. 12, 1968                W. BRUCKERT                3,410,540
                    VAPOR-LIQUID CONTACT SYSTEM AND METHOD
Filed Nov. 9, 1964                                 5 Sheets-Sheet 1

INVENTOR.
WALTER BRUCKERT
BY  Leo A. Plumb, Jr.
ATTORNEY

INVENTOR.
WALTER BRUCKERT
BY Leo A. Plum, Jr.
ATTORNEY

FROTH HEIGHT VERSUS UNIT LIQUID FLOW RATE

INVENTOR.
WALTER BRUCKERT
BY
Leo A. Plump.
ATTORNEY

FROTH HEIGHT VERSUS AIR VELOCITY

INVENTOR.
WALTER BRUCKERT

Nov. 12, 1968  W. BRUCKERT  3,410,540
VAPOR-LIQUID CONTACT SYSTEM AND METHOD

Filed Nov. 9, 1964  5 Sheets-Sheet 5

INVENTOR.
WALTER BRUCKERT
BY Leo A. Plum, Jr.
ATTORNEY

3,410,540
VAPOR-LIQUID CONTACT SYSTEM AND METHOD
Walter Bruckert, Williamsville, N.Y., assignor to Union
 Carbide Corporation, a corporation of New York
Filed Nov. 9, 1964, Ser. No. 409,841
19 Claims. (Cl. 261—113)

ABSTRACT OF THE DISCLOSURE

A vapor-liquid contacting tray comprising perforated fluid contact means as the active portion of the tray surface area, and narrow trough-like downcomers spaced across the tray separating perforated sections and serving to transfer liquid to the next lower tray.

---

This invention relates to vapor-liquid contact systems and particularly to such systems which employ perforated vapor-liquid contact trays.

In present day vapor-liquid contact systems such as wash columns, stripping columns, distillation columns, and the like, liquid is transferred downwardly from tray to tray becoming selectively enriched in a component or components of fluid being processed and vapor is passed upwardly through the trays becoming selectively enriched in another component or components of the fluid. This selective enrichment occurs on each tray as a consequence of a two-phase fluid dispersion (hereinafter called "froth") of discrete vapor bubbles in the liquid formed by the introduction of vapor into the liquid on each tray. Conventional trays which are operated in the foregoing manner are generally either the crossflow or corrugated type and have a perforated active tray surface area.

In the operation of a typical prior art cross-flow tray liquid enters the tray at one side and flows across the tray toward a downcomer at the opposite side of the tray. As the liquid flows across the tray, vapor passing through perforations in the tray surface forms a froth on the tray surface which permits mass transfer to take place. At the outlet from the tray the froth spills over a weir subtending the tray into the downcomer. The downcomer is a device for transferring the liquid phase downward to the next successive tray but which is sealed by such liquid against vapor passage upward therethrough. In the downcomer the vapor separates from the froth leaving a pool of disengaged liquid in the downcomer below the level of the active tray surface. The disengaged liquid enters the next tray under force of its hydrostatic head, independently of the forces which create the froth and move the froth across the tray.

The froth height on a typical crossflow tray is markedly sensitive to fluid flow rates. The stream of froth is required to pass over a short weir at the downcomer inlet and it necessarily forms a high crest over such inlet means. The high crest height is very sensitive to an increase in liquid loading, and at high liquid rates produces a high total froth height. High froth height in turn dictates wide tray spacing and also produces high vapor phase pressure drop across the tray which is costly to the operation of the process.

In a conventional crossflow tray the usual discharge weir cannot reasonably be as long as the tray diameter since the downcomer will then occupy half the cross-section area of the tray and will deleteriously encroach on the vapor-liquid contact area. In most instances, the length of the weir is not more than 70% of the diameter. While prior art downcomer inlet weirs have had adequate capacity for low, conventional flow rates, the short weir must be recognized as a severe obstruction to achieving substantially higher flows with low, controllable froth height.

Another disadvantage of cross-flow trays is the long liquid path to be traversed between inlet and downcomer. Gravity is the usual driving force for promoting flow along this path, and the resulting hydraulic gradient causes non-uniform vapor $\Delta P$ across the tray. The gradient increases at higher liquid rates and the tray becomes unstable and inefficient. With conventional liquid loadings, the gradient may be neutralized with vapor propulsion slots or tabs, but at higher liquid loadings contemplated in this invention there is insufficient horizontal thrust available from the vapor to maintain a high froth velocity without severe gradient.

A further limitation of conventional cross-flow trays is the capacity of the downcomer to discharge its clear liquid. As the liquid load is increased to higher and higher rates the discharge capability of the downcomer is eventually exceeded and liquid backs up onto the tray above. The downcomer then performs in the same manner as the depressions of corrugated trays. The tray is at its flood point, and further increases in liquid rate beyond this point causes the column to fill completely with froth. Still another disadvantage of cross flow trays is their requirement for receiving cups into which the downcomers discharge. Such receiving cups more than double that portion of the tray area devoted to means for merely transporting liquid from tray to tray and such portion is therefore unavailable for accomplishing the primary function of the apparatus: mass transfer. These receiving cups also complicate column manufacture because the fit between downcomers and cups requires precision fabrication and assembly.

The corrugated tray is designed deliberately to "weep" from depressed zones which like the raised zones operate in a flooded or submerged condition. No downcomer is provided and froth exists everywhere across the tray. The hydrostatic head of fluid in the flooded depresions is greater than elsewhere on the tray surface due to the greater depth of the depressions and due to the somewhat higher average density of fluid in the depression. Higher fluid density in the depression results from the fact that the perforations in the depressions are less active than those in the raised zones, i.e., vapor passage upward into the depressions is inhibited although not prevented. Consequently, the tray weeps (leaks) mainly from the depressions thereby providing the principal means for liquid transfer from tray to tray. Unlike the crossflow tray which possesses discrete areas for downward flow of disengaged liquid and discrete areas for upward flow of vapor, the different levels of the corrugated tray do not afford such exclusivity but instead provide only preferential flow paths for liquid and vapor.

The important characteristics of the corrugated tray is that the froth is held on the tray by the flow resistance to liquid being discharged (preferentially) from the depressions. This resistance cannot be reduced arbitrarily to accommodate higher liquid throughput without permitting the tray to dump (run dry) at lower liquid loadings. Furthermore, since the depressions are already flooded, additional driving force for greater liquid flow through the depressions can be obtained only by increasing the froth height everywhere across the tray. Unfortunately, as the froth height increase the vapor phase pressure drop across the tray also increases, and this pressure drop is already one of the major resistance to liquid flow through the depresions. Thus, efforts to increase the liquid rate on corrugated trays is largely self-defeating and will result in extremely high froth height, wide tray spacing, and high vapor phase pressure drop. The extreme sensitivity of the froth height on corrugated trays results in an even more rigid limitation on the vapor loading. In view of the above deficiencies, corrugated trays are extremely limited in rangeability and are inherently not suited to obtaining loadings significantly higher than those conventionally achieved. Improvements must be sought by means of trays, which employ discrete downcomers, and on which the froth height is independent of the method and means for transferring disengaged liquid from tray to tray.

It is an object of this invention to provide a distillation system which is unaffected by the above-described adverse effects to such an extent that a tremendous increase in liquid flow rates can be accommodated without creating problems of excessive entrainment, downcomer flooding, hydrostatic gradient, or high pressure drop; i.e., to provide more mass transfer capacity per unit column volume with lower power consumption. Another object is to provide such a system wherein the froth height is controllable over wide liquid and vapor flow rates, thereby permitting high rangeability of the system at reasonable vapor phase pressure drop. A further object is to provide such a system having accurately predictable hydraulic behavior. Still another object is to provide such a system having tray spacings lower than heretofore possible for desired flow rates. These and other objects and advantages of the present invention are hereinafter described in conjunction with the appended drawings, of which:

In the following description, the length of the downcomer means refers to the horizontal dimension normal to the direction of liquid flow approaching the downcomer. The width of each downcomer means refers to the dimension of the downcomer means inlet parallel to the direction of the approaching liquid.

The objects of the present invention are attained by the use of multiple, narrow, trough-like downcomer means 10 (see FIGURES 1 and 2) which are evenly spaced across a distillation tray surface and extend through perforated fluid contact means 12 such that the perforated fluid contact means 12 is divided into sections of substantially equal surface area per unit length of adjacent downcomer means. Thus by way of example, the ratio of the surface area of the section $12a$ of the perforated fluid contact means 12 of FIGURE 1 to the combined length of the adjacent downcomer means $10a$ and $10b$ is substantially equal to the ratio of the surface area of the section $12b$ to the length of the adjacent downcomer means $10c$. To provide the necessary equality of surface areas per unit length of adjacent downcomer means for purposes of this invention, at least three and preferably more such downcomer means should be provided, equi-spaced across the tray surface as shown in FIGURE 1.

The perforated fluid contact means 12 provides the active major portion of the tray surface area to support a two-phase fluid dispersion of vapor in liquid for mass exchange. Each downcomer means comprises imperforate side walls 14 which define a discrete inactive portion of the tray surface area and which provide an inlet end section 16 for receiving a fraction of the two-phase fluid dispersion from the adjacent section of the perforated fluid contact means 12 and permitting the vapor to disengage therefrom. The imperforate side walls 14 also provide an outlet end section 18 for collecting the liquid disengaged from such fraction and discharging such disengaged liquid from the tray. Each downcomer means further comprises an outlet means 20 (see FIG. 2) which controls the discharge of such disengaged liquid. The tray thus comprises precisely defined areas for vapor flow upward through the perforated fluid contact means 12 and precisely defined areas for liquid flow downward through the multiple downcomer means 10.

By disengaged liquid is meant liquid which is freed of a substantial portion of the vapor in the original froth, so that the apparent density of the disengaged liquid is substantially higher than the froth on the active tray surface. The apparent density of two phase fluids may be expressed as the volume fraction of liquid it contains. Thus the apparent density of active froth, referred to that of clear liquid, may be only 30% whereas the apparent density of disengaged liquid in the downcomer should preferably be above 60%. In a properly functioning downcomer the disengaged liquid acts as a homogeneous fluid and any residual vapor content not released in the disengagement section is swept downward with the liquid through the downcomer outlet.

Figure 1:
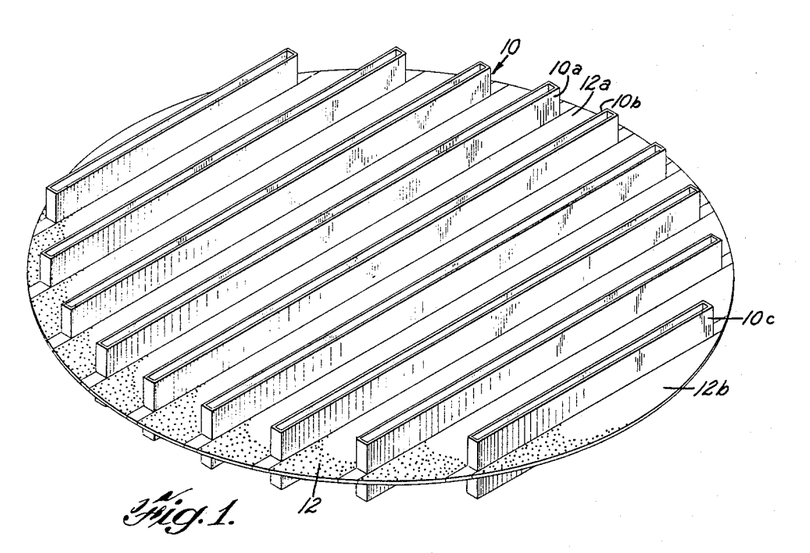
FIG. 1 is a perspective view of a vapor-liquid contacting tray illustrating the present invention.
Figure 2:
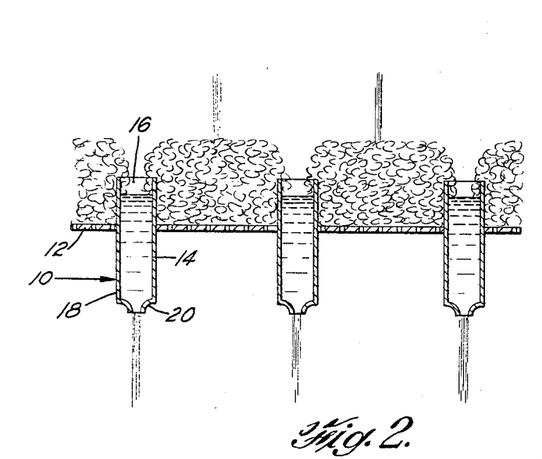
FIG. 2 is a cross-sectional view of a portion of a vapor-liquid contacting tray illustrating the process of the present invention.

As shown in FIGURE 1, the multiple downcomers 10 are positioned parallel to one another across the tray surface. Each downcomer extends substantially from one edge of the tray to an opposite edge along the respective chord of the tray defined by the downcomer.

Figure 3:
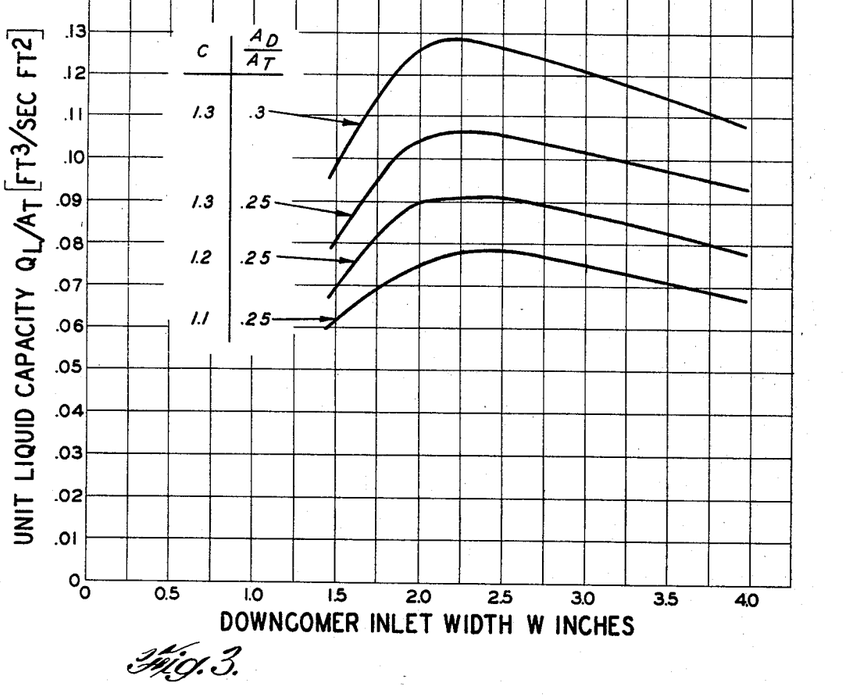
FIG. 3 is a graph plotting exemplary liquid capacities of a vapor-liquid contacting tray constructed according to the present invention.

The multiple narrow, trough-like downcomers of this invention have been discovered to be capable of handling far more fluid for the area they occupy than prior art downcomers. Typical capacities are shown in FIGURE 3 which plots liquid loading ($Q_L/A_T$) vs. downcomer means width in inches (W). The factor $Q_L/A_T$ expresses the cubic feet of liquid handled by a square foot of tray surface per second in time. Each curve describes two design factors:

$A_D/A_T$ is the ratio of downcomer area, $A_D$, to total tray area, $A_T$, i.e. it expresses the fraction of tray area occupied by the multiple downcomer means.

C is called the crest control factor for the downcomer inlet (discussed later) and it reflects the degree of interference created by the opposing crests converging into each downcomer means from each side of the inlet.

The liquid loadings shown by the curves of FIGURE 3 are all above 0.06 cu. ft./sec., sq. ft. The significance of such loadings can be appreciated by comparison with those of prior art perforated trays, which except for very small trays are consistently below 0.05 cu. ft./sec., sq. ft.; for example the liquid loading of a typical 6 ft. diameter column employing crossflow trays is about 0.03 cu. ft./sec., sq. ft.

The multiple downcomers of this invention obtain maximum capacity in widths between 1½ in. and 4 in. A family of curves such as those illustrated in FIG. 3 shows that a choice exists among several downcomer widths for the efficient handling of a required liquid loading $Q_L/A_T$. Assuming for example that the crest control factor is fixed at 1.3, a loading of 0.107 cu. ft./sec. sq. ft. can be handled by downcomers 1⅝ in. wide provided in sufficient number to occupy 30% of the total tray area, or by downcomers 2¼ in. wide provided in sufficient number to occupy 25% of the total area, or (approximately) by downcomers 4 in. wide provided in sufficient number to occupy 30% of the total tray area. For each of the above cited examples, the following length of downcomer means must be provided:

| W | $A_D/A_T$ | Length of downcomers (in feet) per square foot of tray area |
|---|---|---|
| 1⅝ | .30 | 2.2 |
| 2¼ | .25 | 1.3 |
| 4 | .30 | 0.9 |

For the examples illustrated in FIGURE 3, which typify a broad range of applicability, the 2¼ in. wide downcomer achieves highest liquid capacity per unit downcomer area, and when vapor loads are high this downcomer width may be preferred in order to permit maximum area of the tray to be occupied by the perforated contacting surface. However, if vapor loading is not a controlling factor, one of the other downcomer widths may be more economical when fabrication costs are considered. From the standpoint of fabricating cost alone the 1⅝ in. wide downcomer of the foregoing table is less desirable because it requires a downcomer length of 2.2 feet per sq. ft. of tray area to accomplish the same result as a downcomer length of 0.9 feet per sq. ft. of tray area for a 4 in. downcomer width. Also, the 4 in. downcomer width is more desirable than the 2¼ in. downcomer width which requires a downcomers length of 1.3 feet per sq. ft. of tray area.

High vapor capacity becomes practical in the present invention as a result of the ability to control the froth height at a low, uniform level. Low uniform froth height is obtained by means of the long overflow inlet associated with the plurality of downcomer means spaced and distributed across the tray area. The amount of tray area serviced by each unit length of downcomer inlet is small, and consequently the crest of froth flowing over the inlet is very low. Since the total crest height is low, the variation in crest height attendant changes in liquid and vapor flow rates is greatly reduced as compared with the inlets of prior art downcomers. The side walls 14 of the downcomer means of this invention will usually be extended upward beyond the froth-carrying surface of the tray to provide raised inlet weirs of uniform height as shown in FIGURE 1. The crest height is superimposed upon a substantial depth of froth fixed by the weir height and any variation in crest height will be a small fraction of the total froth height. The froth height and the concomittant pressure drop are virtually unaffected by variations in liquid loading and therefore far higher loadings are obtainable than with any prior art tray. This phenomenon provides the unusual rangeability in operation of the present invention compared to prior art systems.

As a general rule, adequate froth height control will be achieved in this invention by providing between about 1.0 and 5.0 ft. of downcomer inlet length per square foot of total tray area. If loading is so low that less than about 1.0 ft. of downcomer inlet length can serve a square foot of tray area efficiently, crest control, gradients, and downcomer capacity are not highly critical and can be handled reasonably well on conventional crossflow trays, perhaps assisted by vapor propulsion. On the other hand, if more than about 5.0 ft. of downcomer inlet length is provided per sq. ft. of tray area then it is apparent that even through downcomers which make optimum use of their area are used, they still occupy a large fraction of the total tray surface; for example, 5.0 ft. of downcomer inlet length per sq. ft. of tray area provided by 2 in. wide downcomers results in about 40% utilization of the tray area for downcomers. More than 5.0 ft. of downcomers inlet length per sq. ft. of tray area requires very close spacing of the downcomers and leaves such a narrow width of perforated area between downcomers that it becomes difficult to receive the liquid falling onto the surface from the tray above without spilling a portion directly into the downcomers. Thus, downcomer area representing 40% tray utilization is about the preferred maximum percentage to be employed in this invention. The lower limits on the downcomer inlet length and downcomer width also result in 7% preferred minimum percentage of the tray area occupied by the multiple downcomers.

In order to provide the requisite downcomer liquid capacity to handle the greatly increased flow rates capable of achievement with the present invention, the width of the downcomer inlet should be between about 0.07–0.4 of the center-to-center spacing of the downcomers across the tray.

In contrast to a conventional crossflow tray where the froth flows into a very wide downcomer from only one direction, a tray constructed according to the teachings of the present invention (see FIGURES 1 and 2) permits the froth to flow into each of the narrow downcomers from both sides of the inlets. As the high design capacity of the tray is approached each of the two converging crests tends to interfere with the passage of the other into the downcomer inlet and this interference causes a slightly higher crest than would be achieved above a downcomer inlet without an opposed crest. It is important to limit such interference so that the froth will experience substantially "free fall" over the downcomer inlet, otherwise congestion within the downcomer may exert major deleterious influences on the total froth height on the tray. The interference effect of the opposing crests in the downcomer inlet can be expressed mathematically as a ratio of the observed crest height $h$ to the observed crest height $h_0$ obtained with the same flow per unit inlet length over a long single-inlet downcomer.

$$C=\frac{h}{h_o}$$

It has been discovered that the system of the present invention must be operated such that the crest control factor C is maintained at a value less than about 1.3. At C values in excess of about 1.3, the two flowing paths of froth into each downcomer inlet bridge the downcomer such that the downcomer inlets function as submerged weirs resulting in instabilities, unpredictable behavior and tray flooding. Below a C value of 1.3, however, none of the above occur. The C value limit of 1.3 is applicable to the downcomers of this invention regardless of their width or spacing or tray size. The operation of any tray constructed in accordance with the teachings of the present invention at a C value less than 1.3 means that flows can be increased to very high rates without marked increase in froth height, and consequently without marked increase in system pressure drop.

High liquid capacity on the tray requires high liquid handling capacity in the downcomers and therefore, the tray area consumed by the downcomers must be utilized to the fullest extent for liquid transport between trays. The liquid handling capacity of the downcomer is critically dependent upon two factors: downcomer width, and downcomer inlet length.

A square foot of tray area occupied by downcomers may be utilized to provide many very narrow downcomers having a very long total inlet length, or it may be used to provide a fewer number of wider downcomers having a shorter total inlet length. The variation between the width W and the downcomer length is shown in the foregoing table, where increasing W from 1⅝ in. to 4 in. reduces the downcomer length per unit area of tray from 2.2 ft./sq. ft. to 0.9 ft./sq. ft.

With reference to FIG. 3, if one moves horizontally from the maximum of any curve toward a fewer number of wider downcomers it means that inlet length is shortened and each foot of inlet is handling more liquid with a higher crest height and with a higher interference factor. Moving horizontally from any maximum toward a larger number of narrower downcomers will add more inlet length so that the crest height goes down. However, the extreme narrowness of the downcomers now becomes the dominant factor controlling capacity and crest interference again goes up. Between these regimes is an area of maximum liquid loading, moderate crest height and moderate interference factor. The resulting maxima in the capacity curves for these downcomers is quite evident in FIGURE 3.

In order that the tray of the present invention will be practical in diverse services, its vapor handling capacity must match its high liquid capacity. High vapor capacity is achieved in part by the low area required for downcomers and in part by the elimination of receiving cups in o which the downcomers discharge from the tray above. Any tray area used for receiving cups is unavailable for vapor flow, and in prior art crossflow trays, for example, the inactive receiving cup area is equal to or greater than the downcomer area. Receiving cups are eliminated in the present invention by terminating the outlet discharge end of the downcomers in the vapor disengagement space of the tray below. Thus, the outlet end 18 of the downcomers must terminate above the downcomer inlets 16 which control froth height on the tray below (see FIGURE 2). Terminating the downcomers within the disengagement space of the tray below not only obviates the need for receiving cups and leaves a maximum portion of the tray surface as active area for vapor passage, but also simplifies column assembly. Tolerances on tray spacing can be generous since no overlap of downcomer and inlet weir of successive trays to form a vapor seal is required.

The downcomer outlet end section 18, as well as the downcomer inlet end section 16, for each of the multiple downcomer means must also be designed to have high flow capacity. High capacity must be obtained despite the fact that the short depth of the downcomer means provides very little hydrostatic head to discharge the liquid. Not only is the downcomer short but the disengaged liquid level in the downcomer must be held well below the inlet so as not to obstruct the free fall of froth into the downcomer. In addition to possessing high capacity, the downcomer outlet must also provide a reliable, stable liquid seal against vapor penetration due to the $\Delta P$ across the tray. Finally, the downcomer outlet must also discharge the liquid in a well directed stream onto the perforated area of the tray below without spillage or deflection into the downcomers on the tray below.

The height of the downcomer must be sufficient to retain the required depth of liquid in the downcomer at a level below the inlet under the highest loading anticipated. The depth of liquid is equal to the sum of the various energy losses incurred when the vapor and liquid phases traverse the tray.

Thus $H_L = \Delta h + \Delta P$ $H_L$ = depth of downcomer liquid, inches $\Delta h$ = head loss of liquid flowing through the downcomer expressed in inches of downcomer liquid $\Delta P$ = gas phase pressure drop across the tray expressed in inches of downcomer liquid.

Figure 4:
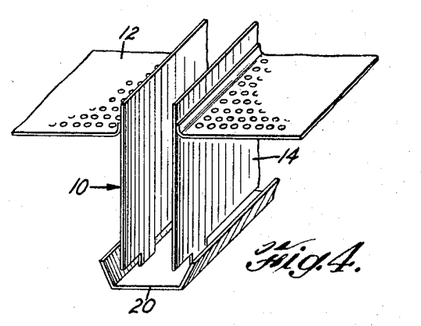
FIGS. 4–6 are perspective views of three exemplary downcomers constructed according to the present invention.
Figure 5:
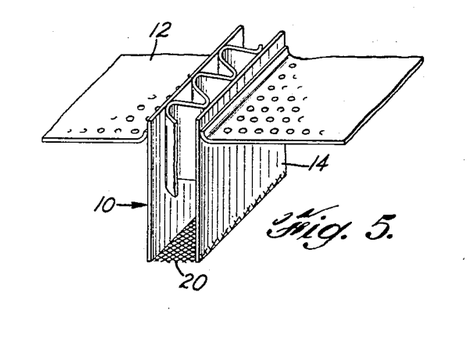
Figures 6, 7:
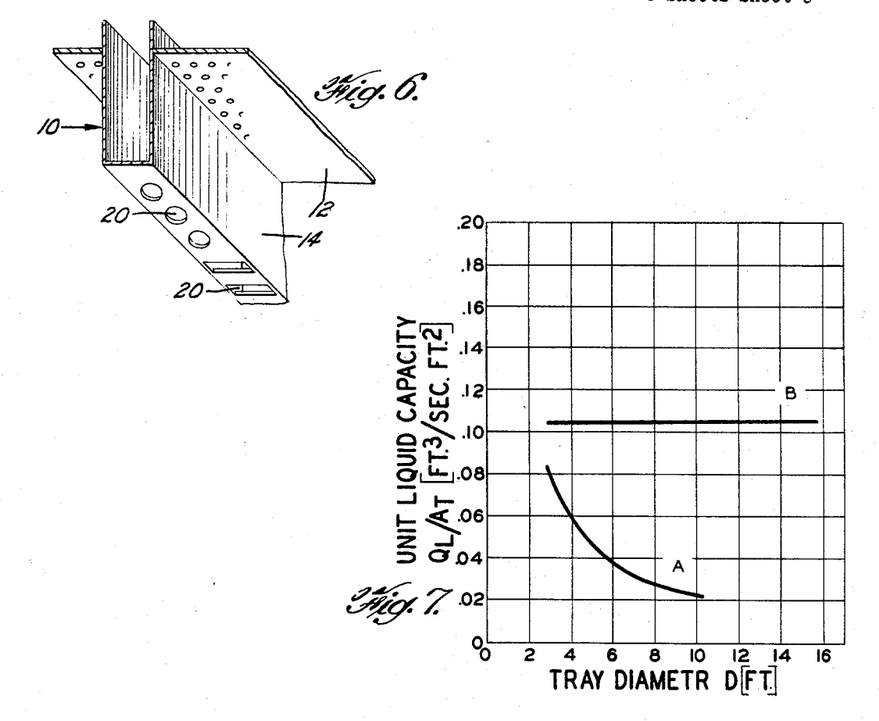
FIGS. 7–8 are graphs plotting comparative exemplary capacities of a conventional counterflow tray and a tray constructed according to the present invention.

Downcomer outlet means 20 which meet the above requirements embody static type liquid seals as shown in FIGS. 4 and 5 or embody dynamic type liquid seals as shown in FIGURE 6.

The downcomer outlet means 20 utilizing the static seal of FIG. 4 employs an elongated cup or trough 21 of imperforate material hung below each downcomer outlet with edges extending upward beyond the downcomer outlet such that a pool of liquid is maintained therein at sufficient depth to immerse the outlet and provide a positive seal. In operation, the sealing effect developed by the downcomer is provided by a column of disengaged liquid standing in the downcomer, plus any overlapping or "trapping" effect furnished by the cup.

The downcomer outlet means 20 of FIG. 5 employs a static seal in the form of a matrix or array of very small openings (smaller than the perforations on the perforated fluid contact means which are designed to pass vapor) having a large total open area, as would be provided by a fine screen for example. Such matrix or array is installed across the bottom of the downcomer, but due to its large open area it presents little obstruction to the downward flow of disengaged liquid. Its positive sealing effect against vapor penetration is provided by the strong surface tension forces developed at the interface when vapor attempts to penetrate the small openings. During operation, a column of disengaged liquid is created on the matrix to a height sufficient to balance the $\Delta P$ across the tray. It has been established that the head loss which the liquid experiences in passing through a screen-type seal should correspond to at least about 0.5 inches of liquid in the downcomer to insure stability.

In the design of screen-type seals, the friction loss will usually be negligible and the seal is designed by the following relationship:

$$\Delta h_w = \frac{.0396\gamma}{P_L D_1}$$

where $\Delta h_w$ = surface tension head loss, inches of liquid
$\gamma$ = surface tension, dynes/cm.
$P_L$ = liquid density, lb./cu. ft.
$D_1$ = dimension of screen opening (assuming a square weave) in inches The downcomer outlet means 20 of FIGURE 6 uses a dynamic seal in the form of a relatively few openings which are usually considerably larger than the perforations in the perforated fluid contact means. These openings constitute orifices or spouts through which the liquid is discharged from the downcomer means. As shown these openings may be circular or rectangular or any other configuration if desired. The large downcomer spouts possess a sealing effect which depends upon a small dynamic head loss which the liquid experiences in passing through the spout. It has been established that this head loss must correspond to at least 0.15 inches of disengaged liquid in the downcomer and preferably between 0.15 and 0.5 inches to insure stability. In addition the reliability of this seal is dependent upon their relatively wide spacing or "scatter" along the downcomer. Such spouts may have a depending lip as shown to aid in directing the discharge of liquid onto the succeeding tray.

Spouts are designed using the well known orifice equation:

$V = C_V \sqrt{2_g \Delta h_D / 12}$ where $V$ = liquid velocity through the spout ft./sec.
$C_V$ = orifice coefficient which may vary between 0.75 and 0.70 depending on the upstream edge of the orifice
$g$ = gravity constant
$\Delta h_D$ = frictional head loss in inches of liquid In order to obtain a dependable dynamic seal one must take into account the transient forces which may permanently disrupt the operation of a downcomer spout. When the froth on the perforated portion of the tray surface crests into the downcomer means of the present invention, wave-like motions are generated in the liquid within the downcomer means on impact of the liquid disengaged from the cresting froth. These motions cause localized momentary fluctuations in the liquid height within the downcomer means. If a wave of sufficient amplitude occurs over a downcomer spout the lateral flow of adjacent liquid into the zone may not be rapid enough to maintain the effective liquid head at the value required to counteract the vapor pressure difference across the tray. Consequently vapor will pass momentarily through the spout into the downcomer means.

Furthermore, at any given location, the ΔP across the tray is not perfectly steady, but fluctuates slightly due to the turbulence of the froth. If the increase in ΔP of sufficient magnitude occurs abruptly it may also cause vapor to penetrate the downcomer liquid momentarily.

An important aspect of the downcomer spout feature of the present invention is that liquid within the downcomer surrounding such a spout will immediately restore liquid flow through the spout after occurrence of a transient. In order to provide positive resealing capability the spouts must be so arranged and distributed along the downcomer as to insure that the liquid head adjacent a spout or small group of spouts is not adversely reduced by transient vapor penetration. Such undisturbed adjacent liquid will exert lateral as well as downward pressure and the lateral influence of this liquid is relied upon to reseal the adjacent spout.

In general, well-spaced openings or spouts can accommodate a transient vapor penetration without permanent disruption since the hydrostatic effect of the transient is localized and "insulated" by dense, undisturbed liquid. In contrast crowded openings result in transient interference between adjacent openings, due to the migration of bubbles over the adjacent openings. When this occurs the effect of the transient spreads rapidly and destroys the hydrostatic seal along the entire length of a downcomer. The downcomer will not again pass liquid unless the downcomer zone becomes flooded with froth to an extreme intolerable depth.

The large spouts of FIGURE 6 can readily be spaced well apart because only a few of them are required. Vapor penetration through one such spout will not influence the seal of adjacent spouts. Furthermore it has been observed that as spouts become larger bubbles produced by vapor penetration become smaller so that the risk of transient interference between spouts is further reduced.

On the other hand small openings must be provided in large numbers, crowded together, in order to obtain the necessary downcomer discharge capacity. Bubble migration spreads the effect of a transient across the crowded spouts. Transient vapor penetration produces bubbles equal to or larger than the diameter of the opening, thus further promoting interference between openings.

Preferred sizes of the spouts of FIG. 6, which obtain the above mentioned advantages are between ⅜ inch and 1½ inches. The size and number of spouts provided per unit length of downcomer should be chosen to provide an orifice head loss of at least 0.15 inch of liquid as stated above.

It is not required or necessarily desirable to space the spouts uniformly along the downcomer. It has been established that several such spouts (e.g., 4 or 5) may be grouped together along the length of the downcomer outlet means, and provided that there is adequate spacing from adjacent groups, such grouping will not result in a disruptive bubble migration of interaction. Four or five is near the limit for the number of spouts in any one group, and spacing between such groups should be at least two to three spout diameters but not less than one inch.

Figure 10:
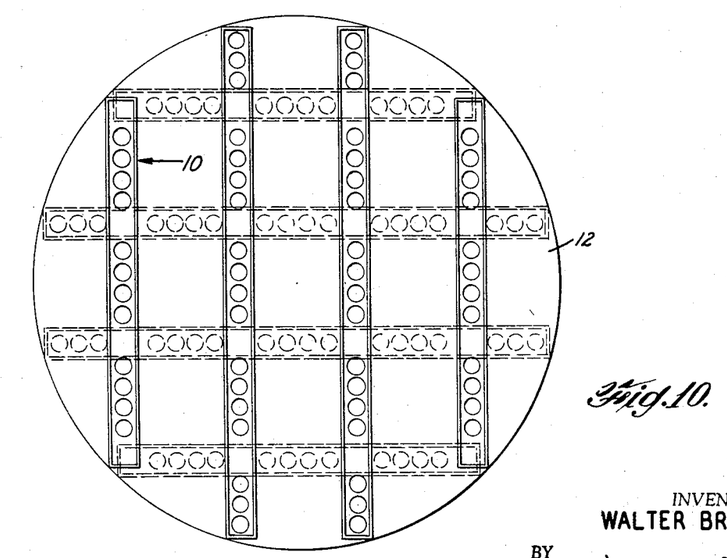
FIG. 10 is a top view of two superimposed trays constructed in accordance with the present invention illustrating an exemplary relative arrangement of such trays in a vapor-liquid contacting column.

Tray arrangement in the column may also influence spout distribution. In preferred usage when outlet spouts are employed the trays of this invention are installed so that downcomers on adjacent (or sequential) trays are aligned at 90°, as shown in FIGURE 10. The spouts should be located so that a stream of liquid does not flow directly into a downcomer beneath. This requirement tends to group the spouts within the downcomer over the active area of the tray below.

As an example to illustrate the procedure employed to design a suitable seal, assume that a propane-propylene mixture is to be separated at a liquid feed rate of 2.3 cu. ft. per second in an 8 ft. diameter column in which each tray is provided with parallel trough-like downcomers totaling 37.4 ft. in length. Assume further that a 50% turn down ratio must be obtained with 1.15 cu. ft. per second of liquid feed rate, that is the downcomer outlet means must provide stability at one-half the designed liquid feed rate.

Thus, for the FIGURE 5 embodiment, $P_L=30$ lb./cu. ft. and $\gamma=$approximately 4 dynes/cm. The value selected for $h_w$ must be greater for screen-type seals than $h_D$ for spout-type seals because surface tension seals do not exhibit the same ability to re-seal after transient vapor passage. Setting $h_w=0.5$ (about the practical minimum):

$$0.5 = \frac{.0396 \times 4}{30 \times D_1}$$

$$D_1 = .0105 \text{ inches}$$

This opening ($D_1$) may be provided in many combinations of mesh and wire size. For example, assuming a fraction open area $f$ of 25% and let $m=$center-to-center dimension between wires, thus:

$$f = \frac{(.0105)^2}{m^2} = .25$$

$$m = .021 \text{ inches}$$

The screen mesh is:

$$M = \frac{1}{m} = 47.6$$

or about 48 x 48/inch² and the wire diameter $d_1$ is:

$$d_1 = m - D_1 = .021 - .0105 = .0105 \text{ inches.}$$

Thus the complete screen specification is 48 x 48 mesh x .0105 inch diameter wire.

To illustrate the procedure employed to design a spout-type seal, assuming the aforementioned example of propane-propylene separation:

$$V = 0.7\sqrt{2 \times 32.2 \times \frac{0.2}{12}} = 0.725 \text{ ft./sec.}$$

The total spout area per tray is:

$$A_s = 1.15/0.725 = 1.6 \text{ ft.}^2 = 231 \text{ in.}^2.$$

Assuming a circular spout having a diameter of 1¼ inches, the number of spouts per tray is:

$$N_s = 231/(1.25^2 \pi/4) = 188.$$

The number of spouts per ft. of downcomer is:

$$N_s/L_D = 188/37.4 = 5.$$

The value of $N_s/L_D$ must now be checked to ascertain if it is compatible with the downcomer spacing, bearing in mind that an integer number of spouts will be grouped to discharge between two downcomers on the tray below, as illustrated for example in FIGURE 10.

(If the downcomer spacing is 12 inches, this check is unnecessary, however in the present example the downcomer spacing for 37.4 ft. of downcomer on a 8 ft. diameter tray is 14 inches.)

Thus:

$$N_s/14 \text{ in.} = 5.85.$$

This is near the integer 6, which is the number of spouts to be provided in each 14 inches of downcomer length. If $N_s/14$ in. had been near 5.5, the computation should be repeated selecting a different spout diameter, otherwise Δh would be significantly different from the desired 0.2 inches.

The improvement in liquid capacity achieved with the tray of the present invention is demonstrated in FIGURE 7 which compares its capacity with that of a typical crossflow tray operating at near maximum capacity. Curve A for the cross-flow tray is achieved with a weir length $b$ at the downcomer inlet equal to 70% of the tray diameter $D$ and a liquid flow rate per unit lentgh of weir ($Q_L/b$) of 0.25 cu. ft./sec./ft. which is a very high loading. Curve B for this invention is achieved for a tray having multiple downcomers 2½ in. wide spaced on 8-in. centers and a liquid flow rate per unit length of weir ($Q_L/b$) of 0.035 cu. ft./sec. As can be seen, the tray of the present invention (curve B) provides a maximum flow rate per unit tray area ($Q_L/A_T$) which is uniform and independent of tray diameter, whereas the crossflow tray suffers a sharp reduction in $Q_L/A_T$ with increased diameter. The reason for this loss of unit liquid capacity in large crossflow trays is that the weir length is proportional to the first power of the tray diameter, while the total tray area is proportional to the second power of the diameter.

Translating the above into a numerical example, a 4-ft. diameter crossflow tray affords a total liquid load on the tray ($Q_L$) of 0.75 cu. ft./sec. whereas the same sized tray of this invention has a capacity of 1.32 cu. ft./sec., or 175% greater capacity. Increasing the crossflow tray size to 6 ft. diameter provides a $Q_L$ of 1.13 cu. ft./sec. or only 150% greater than the capacity at 4 ft. However, increasing the size of the tray of this invention to 6 ft. diameter provides a $Q_L$ of 2.97 cu. ft./sec., or 225% greater than the capacity at 4 ft. Thus, the change in capacity attendant an enlargement of the tray is twice as much with the multiple downcomer tray of this invention.

Figure 8:
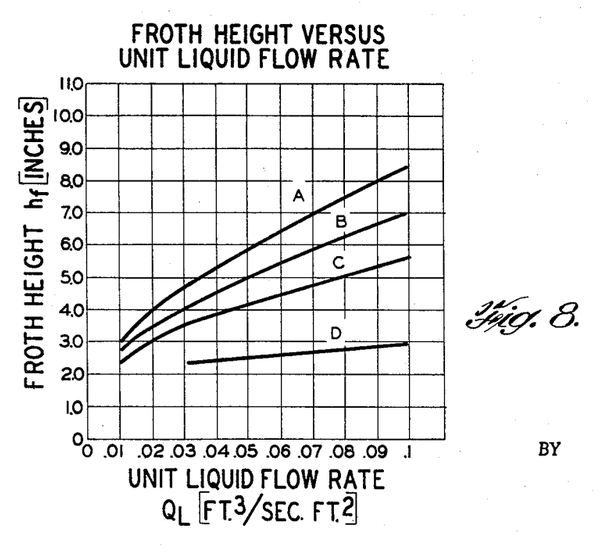

FIGURE 8 shows the improvement in froth height achieved at varying liquid loads with the present invention as compared with conventional crossflow trays. In all cases, the curves represent an exemplary standard air-water test system with a superficial air velocity $V_s$ of 4.0 ft./sec. and a tray surface 3/16 in. perforations and 13.8% free area. Performance is shown for three crossflow trays 7, 5, and 3 ft. in diameter (curves A, B and C respectively), and as in FIGURE 6 an overflow weir length equal to 70% of the diameter is assumed. The steepness of the curves indicates the very serious increase in foam depth which accompanies an increase in liquid loading. Curve D describes performance of a tray of the present invention employing 2½ in. wide downcomers spaced on 8 in. centers and with downcomer inlet weirs 1 in. high. As before mentioned, tray performances in this invention are not affected by column diameter, and one curve is adequate for comparison with curves A, B, and C. It is seen that curve D gives foam depths much lower and less variable than curves A, B, and C. This demonstrates that the trays of the present invention can be spaced closer together and will exhibit less tendency to flood. The advantages are reflected importantly in the achievement of higher liquid loading in a given diameter column and in the ability to achieve sharper separations in columns which are shorter in height. When very large diameter columns are required they may be designed and operated without complications due to gradients, downcomer overloading and excessive foam depths.

Figure 9:
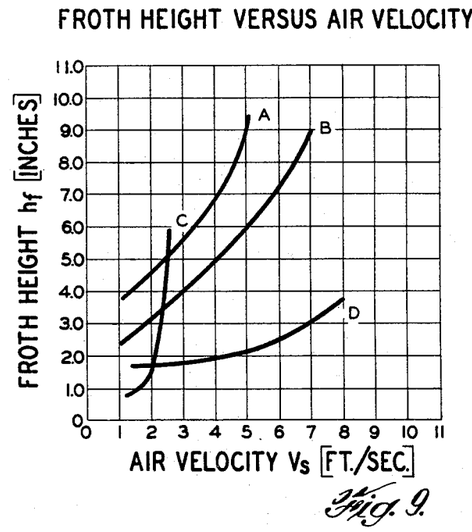
FIG. 9 is a graph plotting comparative exemplary capacities of a conventional counterflow tray, a conventional corrugated tray and a tray constructed according to the present invention.

FIGURE 9 further illustrates the outstanding performance of the multiple downcomer tray of the present invention with respect to vapor loadings in a standard air-water test system at an exemplary unit liquid flow rate ($Q_L/A_T$) of 0.08 ft.$^3$/ft.$^2$ sec. Curves A, B, C and D compare, respectively, 7 ft. diameter and 3 ft. diameter crossflow trays, a corrugated tray, and the multiple downcomer tray of the present invention. Since the performance of the crossflow tray is dependent on diameter, some reasonable tray size such as 3 and 7 ft. diameters must necessarily be selected for this comparison. The advantages of the tray of this invention are self-evident; not only does it operate with much lower, less sensitive froth height than the crossflow tray, it also achieves these low values of froth height at vapor velocities entirely unobtainable in the corrugated tray. The abrupt vertical rise of curve C for the corrugated tray denotes the flooding condition.

The ability to control foam height at low levels permits closer spacing of trays in the column. Minimum tray spacing may be computed as the sum of the downcomer height and the crest height, plus a small clearance (preferably at least ¾ in.) between the top of the froth and the bottom of the downcomer.

The extensive distribution of liquid handling means provided by multiple downcomers is shown in FIG. 10. The preferred embodiment employs at least three downcomers and preferably more as shown in FIG. 10. If three downcomers are employed the chord-shaped areas are reduced to only about 20% of the tray, and the tray possesses essentially all the performance advantages described herein.

When outlet spouts are employed the preferred downcomer locations on successive trays is shown in FIG. 10. Downcomers shown in broken line are on the next tray below. For best operation of a column employing trays constructed according to the present invention, successive trays should be oriented to permit some redistribution of liquid as it progresses from tray to tray through the column inasmuch as there is essentailly no interchange of liquid between tray sections subtended by downcomers on a given tray. Such redistribtuion is facilitated by the 90° orientation of FIG. 10. The use of spouts permits precise direction of downcomer liquid onto the active tray area and avoids direct pouring into a succeeding downcomer.

When the static seals of FIGURES 4 and 5 are used over the full length of the downcomer, such controlled direction of the downcomer liquid is not permitted. With a 90° orientation between trays a minor fraction of the entering liquid will spill directly through the downcomer. This can be avoided by parallel orientation of successive trays and with downcomers staggered or off-set from tray to tray. Proper design will permit the trays to be identical in construction but oriented at 180°. Alternatively spillage into the downcomer may be avoided by blocking off the statically-sealed openings along those sections of downcomers immediately above the downcomer inlets of a tray below.

Figure 11:
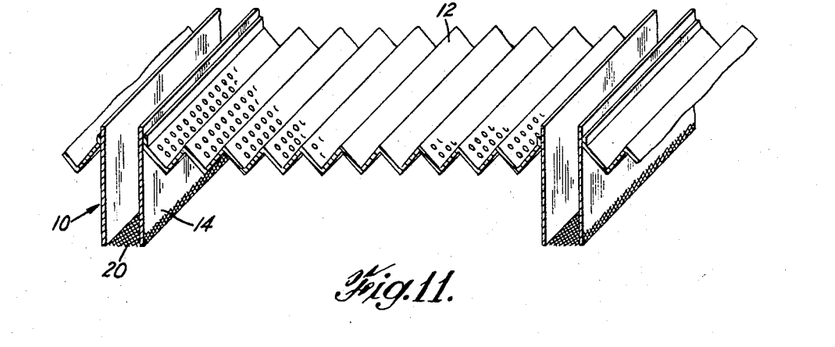
FIG. 11 is a cross-sectional view of a portion of a tray illustrating another embodiment of the present invention.

A modified tray, employing a plurality of downcomer means is illustrated in FIG. 11. In this embodiment, the perforated sieve material of the tray proper is corrugated or pleated, rather than being flat as shown in FIGURE 1. These corrugations or pleats operate in the manner of corrugated trays as described previously providing alternating adjacent bands of unequal hydrostatic head between the downcomer means—the head being sufficient over the valleys of the corrugations to cause liquid "weeping" to the tray below. Vapor passes upward through the peaks of the corrugations where the hydrostatic head is less. Liquid not transferred by the corrugations flows over the weirs into the multiple downcomers, then disengages from its vapor and falls rapidly through the seal provided at the lower end of the downcomer. These corrugations provide still further liquid capacity per unit tray area over and above the high rates obtained with the multiple downcomer tray. It is to be understood that the uncontrolled weeping of liquid from the corrugations permits a small fraction of such liquid to fall directly into the downcomers of the succeeding tray and thereby bypass separation. Furthermore the corrugations of FIG. 11 still suffer the same limitations on liquid transfer capacity enumerated previously herein for the usual corrugated tray. In this embodiment the corrugations merely supplement the liquid handling capacity of the downcomer means. Thus the corrugations, depressions or grids operate with whatever liquid rate they can achieve with the normal low froth height existent on the multiple downcomer tray. The large, major portion of the liquid is still transported through the extensive system of specific downcomer means which maintain low controllable froth heights at high liquid and vapor rates.

To further illustrate the superiority of the present invention the following two practical examples are presented comparing the multiple downcomer tray of the present invention with a typical crossflow tray for use in light hydrocarbon separation.

I

| | Feed | Distillate | Bottoms |
|---|---|---|---|
| Composition (wt. percent): | | | |
| $C_3H_8$ | 0.7 | 2.8 | |
| $iC_4H_{10}$ | 24.5 | 96.0 | 3.0 |
| $iC_4H_8$ | 0.1 | .2 | 0.1 |
| $nC_4H_{10}$ | 73.4 | 1.0 | 95.2 |
| $iC_5H_{12}$ | 1.3 | | 1.7 |
| Flow (lb./hr.) | 128,730 | 29,770 | 98,960 |

| | Crossflow Tray | Multiple Downcomer Tray (11 2½" downcomers per tray) |
|---|---|---|
| Tray Diameter (inches) | 140 | 120 |
| Froth Height (inches) | 9.3 | 5.0 |
| ΔP Tray (mm. Hg) | 4.1 | 2.3 |
| Tray Spacing (inches) | 18.5 | 14.0 |
| $Q_L/b$ (ft.$^3$/sec.×ft.) | 0.5 | 0.03 |
| $P_L$ (lb./ft.$^3$) | 31.2 | 31.2 |
| $P_L$ (lb./ft.$^3$) | 1.6 | 1.6 |

This example illustrates that for a given number of trays, the present invention can achieve the same separation in a column of smaller diameter and overall height with a considerably lower vapor pressure drop across each tray.

II

| | Feed | Distillate | Bottoms |
|---|---|---|---|
| Composition (wt. percent): | | | |
| $C_3H_6$ | 47.5 | 87.0 | 8.6 |
| $C_3H_8$ | 29.5 | 13.0 | 45.7 |
| $C_4H_8$ | 23.0 | | 45.7 |

| | Crossflow Tray | Multiple Downcomer Tray (9 1½ downcomers per tray) |
|---|---|---|
| Diameter, inches | 58 | 58 |
| No. Trays | 80 | 98 |
| Tray Spacing, inches | 10 | 8 |
| Feed Rate, percent | 100 | 154 |
| Tray Efficiency, percent | 72 | 75 |
| L/V Ratio | .923 | .895 |

This example illustrates that for a column of a given diameter and overall height, the present invention obtains the same separation using a much higher feed rate. More trays of higher efficiency can be installed in the column, permitting such separation while maintaining a lower $L/V$ ratio.

Figure 12:
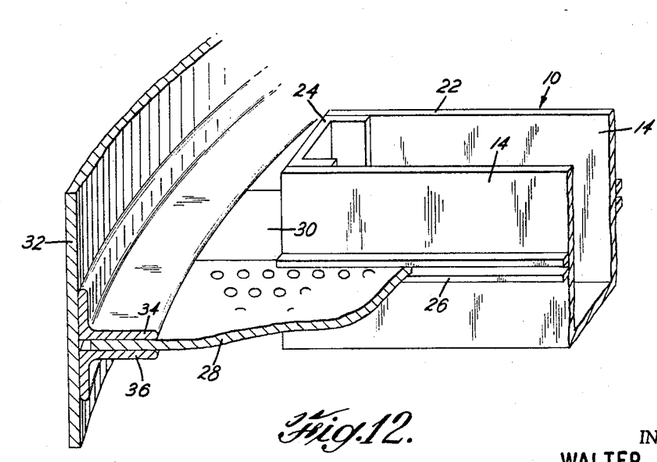
FIG. 12 is a perspective view of a portion of a tray constructed in accordance with the present invention illustrating its construction.

FIGURE 12 shows a sectional view of the preferred construction of the tray of this invention. Each of the multiple downcomers 10 is constructed of a U-shaped channel member 22 having imperforate sides 14 and a bottom member containing outlet means in the form of spouts. The ends of the multiple downcomers are enclosed by a member such as channel 24. Means 26 are provided along the exterior surface of each side wall 14 to support individual perforated plates 28 which form the perforated fluid contact means. If the channel member 22 is constructed of an easily extrudable material such as aluminum, means 26 can be extruded in the form of the channel shown during the extrusion of channel member 22. Means 26 might also be provided by angle support members or other similar members which can be braised or welded to the side walls 14.

To facilitate fabrication of the tray shown in FIGURE 12, the downcomers 10 do not extend from edge-to-edge of the tray but terminate a short distance inward from the edge leaving a space which may be occupied by a perforated plate or by a non-perforated filler plate 30, as shown. Inasmuch as the area occupied by spaces between the ends of the multiple downcomers and the edges of the tray will constitute a very minor portion of the total tray area, the use of non-perforated filler plates will not noticeably affect the performance of the tray.

When the perforated plates 28 are fixed in place along the side walls 14 of the downcomers, for example by welding or braising them to means 26, the tray is placed in a column and supported from the column wall 32 by suitable means such as angle support members 34 and 36.

By extending each downcomer 10 substantially from one edge of the tray to an opposite edge as shown in FIGURES 1 and 12, the multiple downcomers become structural components of the tray that stabilize the adjacent perforated fluid contact means 12 and make the tray self-supporting. Thus, adjacent (or sequential) trays in the column need not be supported or separated by special spacing or load bearing means. If desired, the structural rigidity of the side walls of each downcomer means may be reinforced by bracing means, such as the serpentine strips shown in FIG. 5, which are designed and oriented to impose a minimum restriction to fluid flow in the vertical direction.

Although preferred embodiments of the invention have been described in detail, it is contemplated that modifications of the system may be made and that some features may be employed without others, all within the spirit and scope of the invention. For example the large spouts of FIG. 6 may be additionally covered by the matrix of FIG. 5 thereby affording both the liquid directing advantage of spouts and the additional surface tension sealing effect of the matrix.

What is claimed is:

1. A vapor-liquid contacting tray which comprises: perforated fluid contact means providing an active major portion of the tray surface area to support a two-phase fluid dispersion of vapor in liquid for mass exchange; and at least three narrow, trough-like downcomer means evenly spaced across the tray in parallel relation to each other and extending through said perforated fluid contact means as the sole liquid transfer means and comprising the minor portion of said tray surface area such that said fluid contact means is divided into sections of substantially equal surface area per unit length of adjacent downcomer means, each downcomer means comprising (1) two spaced longitudinal inlet edges each adjacent to a section of said active portion and 1.0–5.0 feet downcomer longitudinal inlet edge per square foot of tray surface area, (2) imperforate relatively long and deep longitudinal side walls and imperforate relatively short transverse end walls which (a) define a discrete inactive portion of the tray surface area, (b) provide an inlet end section for receiving a fraction of said two-phase fluid dispersion and permitting vapor to disengage therefrom, and (c) provide an outlet end section for collecting disengaged liquid and discharging such disengaged liquid from the tray and (3) liquid sealable outlet means which control the discharge of such disengaged liquid being contiguously associated with the lower end of said side and end walls and having a vertical axis, said outlet means having cross-sectional area smaller than said inlet end section but sufficiently large to maintain the liquid level below said inlet end.

2. Apparatus according to claim 1 wherein the width of each of said downcomer means is between about 1½ and 4 inches.

3. Apparatus according to claim 1 wherein said imperforate side walls of each of said downcomer means extends upward beyond said tray surface to provide raised inlet weirs.

4. Apparatus according to claim 1 wherein the width of each of said downcomer means is between about 0.07 and 0.4 of the center-to-center spacing of said downcomer means across said tray.

5. Apparatus according to claim 1 wherein the outlet means of each of said downcomer means comprises screen material attached to said outlet end section and having small openings therethrough so constructed that a sealing effect against vapor penetration may be provided by surface tension of liquid filling the small openings such that a pool of disengaged liquid may be maintained in said downcomer means.

6. Apparatus according to claim 1 wherein the outlet means of each of said downcomer means comprises a member attached to said outlet end section having a multiplicity of longitudinally spaced spouts therein so constructed that a sealing effect against vapor penetration may be provided by a stable head loss of liquid passing therethrough such that a pool of disengaged liquid may be maintained in said downcomer means.

7. Apparatus according to claim 6 wherein each of said spouts is provided with a depending rim to aid in directing the discharge of liquid therethrough.

8. Apparatus according to claim 6 wherein each of said spouts are rectangular.

9. A vapor-liquid contacting column which comprises a plurality of vapor-liquid contacting trays as defined in claim 1 vertically spaced apart such that the downcomer outlet means of each such tray terminate in the vapor disengagement space of the tray below and wherein adjacent trays are positioned such that their respective downcomer means are horizontally aligned at 90° relative to one another.

10. Apparatus according to claim 9 wherein the outlet means of each of said downcomer means comprises a member attached to said outlet end section having several groups of spouts therein spaced along the length of each of said downcomer means such that liquid is discharged therefrom only onto the perforated fluid contact means of the tray below between the downcomer means of such tray.

11. Apparatus according to claim 1 wherein each of said downcomer means is constructed of a U-shaped channel member having imperforate sides and a bottom member containing said outlet means; and wherein said U-shaped channel member is provided with means along the exterior surface of said imperforate sides constructed to support individual perforated plates comprising said perforated fluid contact means.

12. A vapor-liquid contacting column which comprises a plurality of identical vapor-liquid contacting trays as defined in claim 1, vertically spaced apart such that the downcomer outlet means of each such tray terminate in the vapor disengagement space of the next lower tray and over only said perforated fluid contact means of said next lower tray, and with adjacent trays oriented such that their respective downcomer means are horizontally aligned at 90° relative to one another.

13. In a process for contacting liquid and vapor on a tray having a perforated fluid contact surface comprising an active major portion of the tray surface area, and having at least three, narrow trough-like downcomers each with two spaced longitudinal edges facing each other with said downcomers extending through said perforated fluid contact surface and being evenly spaced across the tray such that said fluid contact surface is divided into sections of substantially equal surface area per unit length of adjacent downcomer, the steps of: introducing said liquid on said perforated fluid contact surface and introducing vapor through said perforated fluid contact surface into said liquid to form a two-phase fluid dispersion of vapor in liquid for mass exchange; discharging (a) fractions of said two-phase fluid dispersion over the two longitudinal edges into each of said downcomers as converging crests at a suitable rate to maintain a crest control factor value less than about 1.3 to permit liquid to disengage from such fractions within the respective downcomers; and discharging liquid from said downcomers through a dynamic seal at a suitable rate in the downwardly vertical direction to prevent vapor penetration into said downcomers and at a suitable rate such that the depth of the two-phase fluid dispersion on said tray is uneffected by the height of disengaged liquid in the downcomers.

14. A process according to claim 13 wherein liquid is discharged from the downcomers through spouts at a rate such that the head loss of the discharging liquid corresponds to at least 0.15 inches of liquid in the downcomers.

15. A process according to claim 13 wherein liquid is discharged onto a subsequent tray in a manner such that each section of the perforated fluid contact surface receives a substantially equal fraction of said liquid per unit area of such surface.

16. In a process for contacting liquid and vapor on a tray having a perforated fluid contact surface comprising an active major portion of the tray surface area, and having at least three, narrow trough-like downcomers each with two spaced longitudinal edges facing each other with said downcomers extending through said perforated fluid contact surface and being evenly spaced across the tray such that said fluid contact surface is divided into sections of substantially equal surface area per unit length of adjacent downcomer, the steps of: introducing said liquid on said perforated fluid contact surface and introducing vapor through said perforated fluid contact surface into said liquid to form a two-phase fluid dispersion of vapor in liquid for mass exchange; discharging (a) fractions of said two-phase fluid dispersion over the two longitudinal edges into each of said downcomers as converging crests at a suitable rate to maintain a crest control factor value less than about 1.3 to permit liquid to disengage from such fractions within the respective downcomers; and discharging liquid from said downcomers through a static seal at a suitable rate in the downwardly vertical direction such that the depth of the two-phase fluid dispersion on said tray is unaffected by the height of disengaged liquid in the downcomers.

17. A process according to claim 16 wherein liquid is discharged from the downcomers through a screen-type surface tension seal at a rate such that the head loss of the discharging liquid corresponds to at least about 0.5 inches of liquid in the downcomers.

18. In a vapor-liquid contacting column having a plurality of vertically spaced perforated fluid contacting trays and liquid downcomers means for transferring liquid from each tray to the next lower tray, the improvement comprising:

(a) at least three narrow, trough-like downcomer means evenly spaced across each tray in parallel relation to each other and extending through the perforated active portion of the tray surface area as the sole liquid transfer means such that the tray is divided into discrete perforated sections of substantially equal surface area per unit length of adjacent downcomer means, each downcomer means comprising (1) two spaced longitudinal inlet edges each adjacent to a section of said perforated active portion of the tray, (2) imperforate relatively long and deep longitudinal side walls and imperforate relatively short transverse end walls which define a discrete inactive portion of the tray surface area, provide an inlet end section for two-phase fluid and an outlet end section for collecting and discharging disengaged liquid, and (3) liquid sealable outlet means for controlling the discharge of such disengaged liquid being contiguously associated with the lower end of said side and end walls and having a vertical axis, said outlet means having cross-sectional area smaller than said inlet end section but sufficiently large to maintain the liquid level below said inlet end section, (b) the plurality of trays and their downcomer outlet means (3) being constructed and vertically spaced such that the downcomer outlet means of each tray terminate in the vapor disengagement space of and over only said perforated active portion of the next lower tray, and (c) the plurality of trays being oriented such that the corresponding downcomer means of adjacent trays are horizontally aligned at 90° relative to one another.

19. Apparatus according to claim 18 in which the outlet means of each downcomer means comprises a member attached to said outlet end section having a multiplicity of longitudinally spaced spouts.

References Cited

UNITED STATES PATENTS

| | | | |
|---|---|---|---|
| 1,605,263 | 11/1926 | Millard | 261—114 |
| 2,319,814 | 5/1943 | Harmon | 261—113 |
| 2,646,977 | 7/1953 | Kraft | 261—114 |

FOREIGN PATENTS

| | | |
|---|---|---|
| 139,095 | 10/1934 | Austria. |
| 617,942 | 4/1961 | Canada. |
| 627,942 | 3/1936 | Germany. |
| 823,108 | 11/1959 | Great Britain. |

HARRY B. THORNTON, *Primary Examiner.*

TIM R. MILES, *Assistant Examiner.*